(No Model.)
R. H. WILSON.
CHINCH TRAP.
No. 391,930. Patented Oct. 30, 1888.
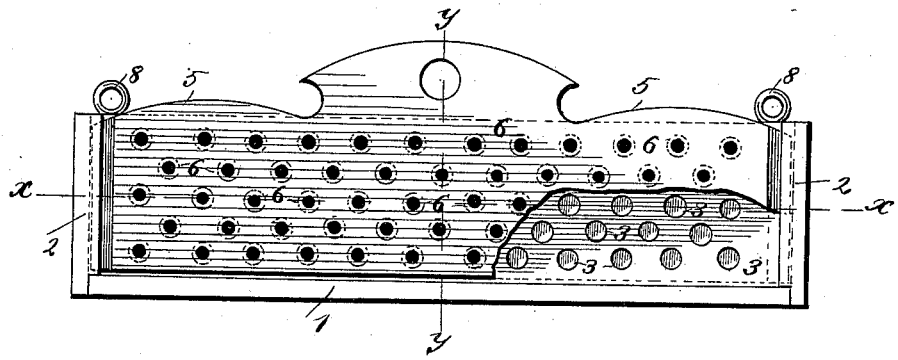
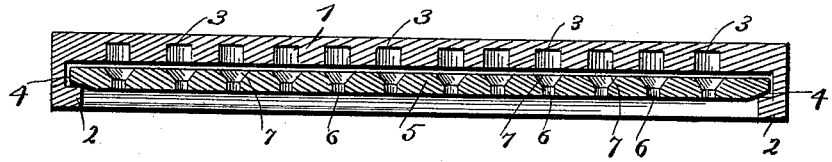
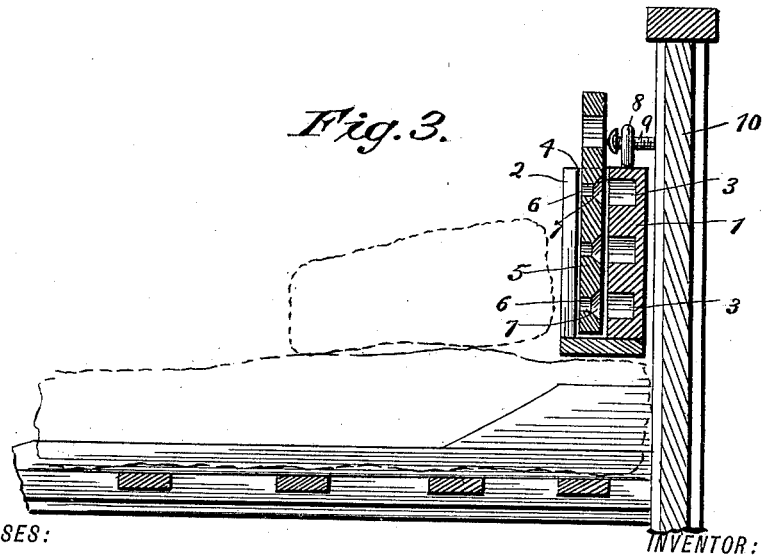
WITNESSES:
Phil. C. Dietrich.
E. M. Clark.
INVENTOR:
Robt. H. Wilson.
BY Munn & Co.
ATTORNEYS.

UNITED STATES PATENT OFFICE.

ROBERT H. WILSON, OF TIMBER LAKE, COLORADO.

CHINCH-TRAP.

SPECIFICATION forming part of Letters Patent No. 391,930, dated October 30, 1888.

Application filed July 24, 1888. Serial No. 280,582. (No model.)

*To all whom it may concern:*

Be it known that I, ROBERT H. WILSON, of Timber Lake, (Lay P. O.,) in the county of Routt and State of Colorado, have invented a new and Improved Chinch-Trap, of which the following is a full, clear, and exact description.

This invention relates to insect-traps, and has special reference to an insect-trap adapted to catch chinches or what are familiarly known as "bedbugs."

The invention consists in a trap for this purpose constructed and employed as hereinafter described and claimed.

Reference is to be had to the accompanying drawings, forming a part of this specification, in which similar figures of reference indicate corresponding parts in all the views.

Figure 1 is a front view of the invention, partly broken away. Fig. 2 is a horizontal section on line $x\ x$, Fig. 1; and Fig. 3 is a view thereof in vertical section, showing it applied to a bedstead, partly broken away and in section.

The trap consists of a frame, 1, formed with an open side, 2, a series of internal recesses, 3, of oval or other suitable shape, and vertical grooves 4 in its ends, in which is mounted a slide, 5, having openings 6, registering with the recesses 3 when the slide 5 is in closed position. The openings 6 are preferably formed with flaring inner ends, 7, corresponding in size with the openings of recesses 3. The frame 1 and slide 5 are preferably made of aspen wood, as it attracts the chinches.

In use the trap is placed on a mattress at the head of a bed, as shown in Fig. 3, and is secured to the head of the bed to maintain it in a vertical position by eye-screws 8, engaging screws 9 in the head-board 10, or by other suitable means. A space is left between the pillows and the openings 6, as shown in Fig. 3, so as to leave the openings 6 uncovered. As the chinch-bugs seek recesses and cavities which are dark, and in addition are attracted by the aspen-wood, the trap will be found to contain them after having been located as above described all night. The bugs will secrete themselves in the trap whether the bed is occupied or not. In the morning the trap may be removed to a suitable place for destroying the bugs, and upon raising the slide 5 they will be found in the recesses 3, from which they can be dislodged and destroyed.

If desired, the trap may be baited with any suitable substance placed in the bottom of the recesses 3.

While I have set forth a specific construction of parts, I do not intend to limit myself thereto, as they may be varied without departing from the essential features of the invention.

By means of this invention an effective means is provided for thoroughly getting rid of bedbugs.

It is obvious that the trap may be used to catch any kind of insects which secrete themselves in crevices and places from which it is difficult to dislodge them.

Having thus described my invention, I claim as new and desire to secure by Letters Patent—

A chinch-trap consisting of frame 1, having open side 2, internal recesses, 3, and end vertical grooves, 4, and the slide 5, mounted in grooves 4 and having openings 6, with flaring inner ends, 7, registering with recesses 3, substantially as described.

ROBERT H. WILSON.

Witnesses:
 MALCOLM G. FROST,
 JAMES L. UNDERWOOD.